United States Patent [19]

Center

[11] E Patent Number: Re. 33,098

[45] Reissued Date of Patent: Oct. 24, 1989

[54] EXPLOSIVELY-OPERATED TOOL

[75] Inventor: Warren A. Center, Alton Bay, N.H.

[73] Assignee: Burndy Corporation, Norwalk, Conn.

[21] Appl. No.: 323,429

[22] Filed: Mar. 14, 1989

Related U.S. Patent Documents

Reissue of:

[64] Patent No.: 4,722,189
Issued: Feb. 2, 1988
Appl. No.: 914,332
Filed: Oct. 2, 1986

[51] Int. Cl.[4] ..... F01B 29/08; F02N 13/00

[52] U.S. Cl. ..... 60/635; 60/632; 60/636

[58] Field of Search ..... 60/632, 635, 636

[56] References Cited

U.S. PATENT DOCUMENTS

| | | | |
|---|---|---|---|
| 1,622,109 | 3/1927 | Haworth . | |
| 1,644,375 | 10/1927 | Haworth . | |
| 2,030,803 | 2/1936 | Temple | 140/113 |
| 2,106,724 | 2/1938 | Cope | 173/273 |
| 2,141,098 | 12/1938 | Wahlstrom | 173/269 |
| 2,968,043 | 1/1961 | Demler | 1/215 |
| 3,044,071 | 7/1962 | Behrend | 1/44.5 |
| 3,065,449 | 11/1962 | Matthysse | 339/247 |
| 3,155,039 | 11/1964 | Broske | 102/38 |
| 3,173,369 | 3/1965 | Broske | 102/38 |
| 3,212,534 | 10/1965 | Broske | 140/113 |
| 3,218,096 | 11/1965 | Press | 285/332.1 |
| 3,235,944 | 2/1966 | Broske | 29/155.5 |
| 3,257,499 | 6/1966 | Broske | 174/94 |
| 3,292,363 | 12/1966 | Wahl | 60/26.1 |
| 3,296,792 | 1/1967 | Hedberg | 60/26.1 |
| 3,349,167 | 10/1967 | Mixon | 174/94 |
| 3,458,996 | 8/1969 | Mixon | 60/26.1 |

FOREIGN PATENT DOCUMENTS

| | | |
|---|---|---|
| 652429 | 4/1951 | United Kingdom . |
| 2091395 | 7/1982 | United Kingdom . |

OTHER PUBLICATIONS

Ampact Taps, Stirrups, and Application Tooling, Ampinc. 8-5-77.

*Primary Examiner*—Allen M. Ostrager
*Attorney, Agent, or Firm*—Blodgett & Blodgett

[57] ABSTRACT

Power tool for the assembly of electrical connectors including a chamber for receiving an explosive element and a firing element associated therewith.

23 Claims, 7 Drawing Sheets

BEFORE LOADING (SAFE POSITION)

READY TO FIRE

EXPLOSIVELY-OPERATED TOOL

Matter enclosed in heavy brackets [ ] appears in the original patent but forms no part of this reissue specification; matter printed in italics indicates the additions made by reissue.

*This application is a reissue of U.S. Patent No. 4,722,189.*

BACKGROUND OF THE INVENTION

In the installation of electrical power distributions systems, it is common practice to run a tap wire from a permenantly-installed main power cable. To accomplish this it is common practice to embrace the cable and the wire in a sleeve and to drive a wedge between the cable and tap wire (inside of the sleeve). This locks the sleeve, cables, and wedge together to make a strong physical and electrical connection. For a proper installation, it is not only necessary to drive the wedge into the sleeve with considerable force, but also to do so with a selected force commenserate with the size of the sleeve and wedge that is used, thus, obtaining a standard, reproducible force between the elements. For this purpose, it is usual practice to use a power tool of the type that is shown and described in the Wahl U.S. Pat. No. 3,292,363, which makes use of a explosive cartridge to generate the force between the sleeve and the wedge. Among other features of such a power tool, it is important that the operation be carried out very quickly and under the greatest safety conditions, because the worker in many instances is working high above the ground with high voltage power lines. The prior art devices, however, have been slow to operate, because, in order to release the trapped pressure gases resulting from the explosion, it is necessary to carry out a time-consuming unscrewing operation at the back of the chamber. Furthermore, some of the devices are unsafe, because there is nothing to prevent premature actuation of the explosive device before that the obturating mechanism is fully secured. These and other difficulties experienced with the prior art devices have been obviated in a novel manner by the present invention.

It is, therefore, an outstanding object of the invention to provide a power tool in which safety is promoted by rendering the the firing mechanism inoperative until the obturating mechanism has been fully secured.

Another object of this invention is the provision of a power tool for use in making electrical connections, wherein the pressure gas in the chamber is quickly and easily released after the explosion.

A further object of the present invention is the provision of a power tool in which the cycle of loading, firing, and unloading takes place very quickly.

It is another object of the instant invention to provide a tool using an explosive cartridge in which the cartridge is inoperative until the tool is in position for firing.

A still further object of the invention is the provision of a power tool in which the complete closing and sealing of the obturating mechanism is made clearly evident to the operator.

It is still a further object of the invention to provide a tool for use in assembling an electrical connector which is simple in construction, which is inexpensive to manufacture, and which is cable of a long life of useful service with a minimum of maintenance.

It is a still further object of the present invention to provide a power tool for assembling an electrical connector in which the cartridge is inoperative until the tool has been properly located on the connector for firing.

Another object of the invention is the provision of a power tool using an explosive cartridge in which the cartridge is rendered firable and the firing mechanisms is rendered operable by the placement of the tool on the article that is to be connected.

SUMMARY OF THE INVENTION

In general, the present invention consists of a tool for use in assembling an electrical connector which connector includes a clamp and a wedge. The tool includes a base having an anvil at one end to engage the clamp and an abutment at the other end having a threaded bore aligned with the anvil. A threaded adjusting member is carried in the threaded bore, the adjusting member having a primary bore coaxial of the threaded bore that is in which is slidable carried a driving rod. A chamber is mounted on the adjusting member and has a chamber bore adapted to receive a tubular cartridge containing a piston having an explosive power cell. A striker is mounted in alignment with the cartridge and the driving rod, which striker has a firing pin aligned with the said power cell. The piston is movable within the cartridge by contact with the rod from a first position spaced from the firing pin to a second position adjacent the firing pin.

In particular, a tubular housing is slidably and rotatably carried on the cylindrical head of the chamber. A detent is mounted on the housing and is engagable with a recess formed in the said cylindrical head to lock the housing in a selected firing position on the head.

More specifically, the gas pressure resulting from the actuation of the power cell is relieved, after firing, by flow through a passage in the cartridge into the housing and through a window formed in the housing to the exterior of the housing.

The character of the invention, however, may be best understood by reference to one of its structural forms, as illustrated by the accompanying drawings, in which:

FIG. 1 is a perspective view showing the tool of the present invention in use in installing an electrical connector, FIG. 2 is a perspective view of the tool, FIG. 3 is a perspective view of a drive rod forming part of the invention, FIG. 4 is a perspective view of a portion of the tool with parts broken away, FIG. 5 is a sectional view of the invention taken on the line V—V of FIG. 4, FIG. 6 is an exploded view of a cartridge forming part of the present invention, FIG. 7 is a vertical sectional view of the assembled cartridge in its condition before loading, FIG. 8 is a vertical section of the cartridge in its condition ready to fire, FIG. 9 is a front elevational view of a main screw forming part of the invention, FIG. 10 is a top plan view of the screw, FIG. 11 is a end elevational view of the screw, taken along the line XI—XI of FIG. 9, FIG. 12 is front elevational view of a housing forming a part of the invention, FIG. 13 is vertical sectional view of the housing, taken on the line XII—XII of FIG. 12, FIG. 14 is a front elevational view of a bushing forming part of the invention, FIG. 15 is front elevational view of a hammer forming part of the invention, FIG. 16 is front elevational view of a firing forming part of the invention, FIG. 17 is a front elevational view of extractor forming part of the invention, FIG. 18 is a right-hand end elevational view of the extractor, FIG. 19 is front elevational view of a safety latch forming part of the invention, FIG. 20 is a front elevational view of a hammer block, FIG. 21 is a side elevational view of the hammer block, FIG. 22-27 shows the tool housing and associated mechanisms in various stages of loading and firing.

DESCRIPTION OF THE PREFERRED EMBODIMENT

Figure 1:
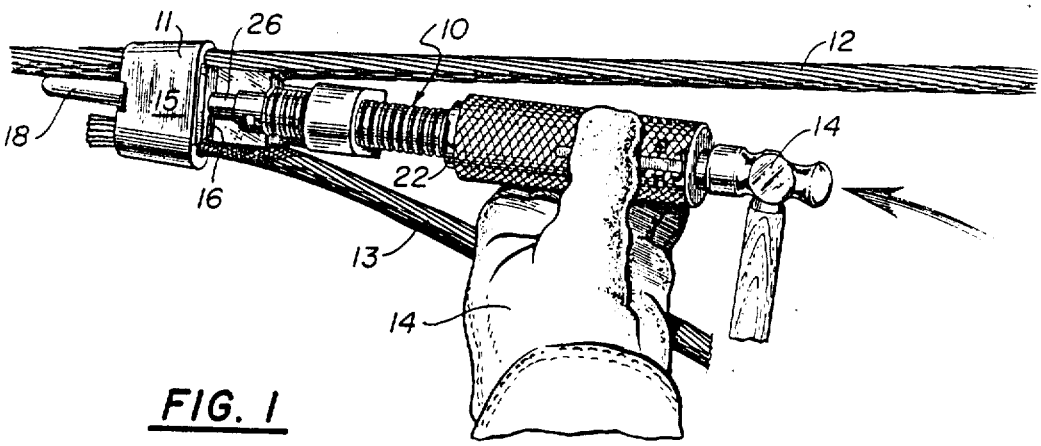

Referring first to FIG. 1, wherein are best shown the general features of the invention, the tool, indicated generally by the reference numeral 10, is shown being used in assembling a connector 11 to join a main power cable 12 to a tap or branch cable 13. The gloved left hand 14 of the operator shown grasping the tool 10, while the hammer 14 is shown as striking the tool to actuate it. As is evident in the drawing, the connector 11 consists of a C-member or sleeve 15, which embraces the cables 12 and 13, and of a wedge 16 which is driven within the sleeve 15 between the cables 12 and 13.

Figure 2:
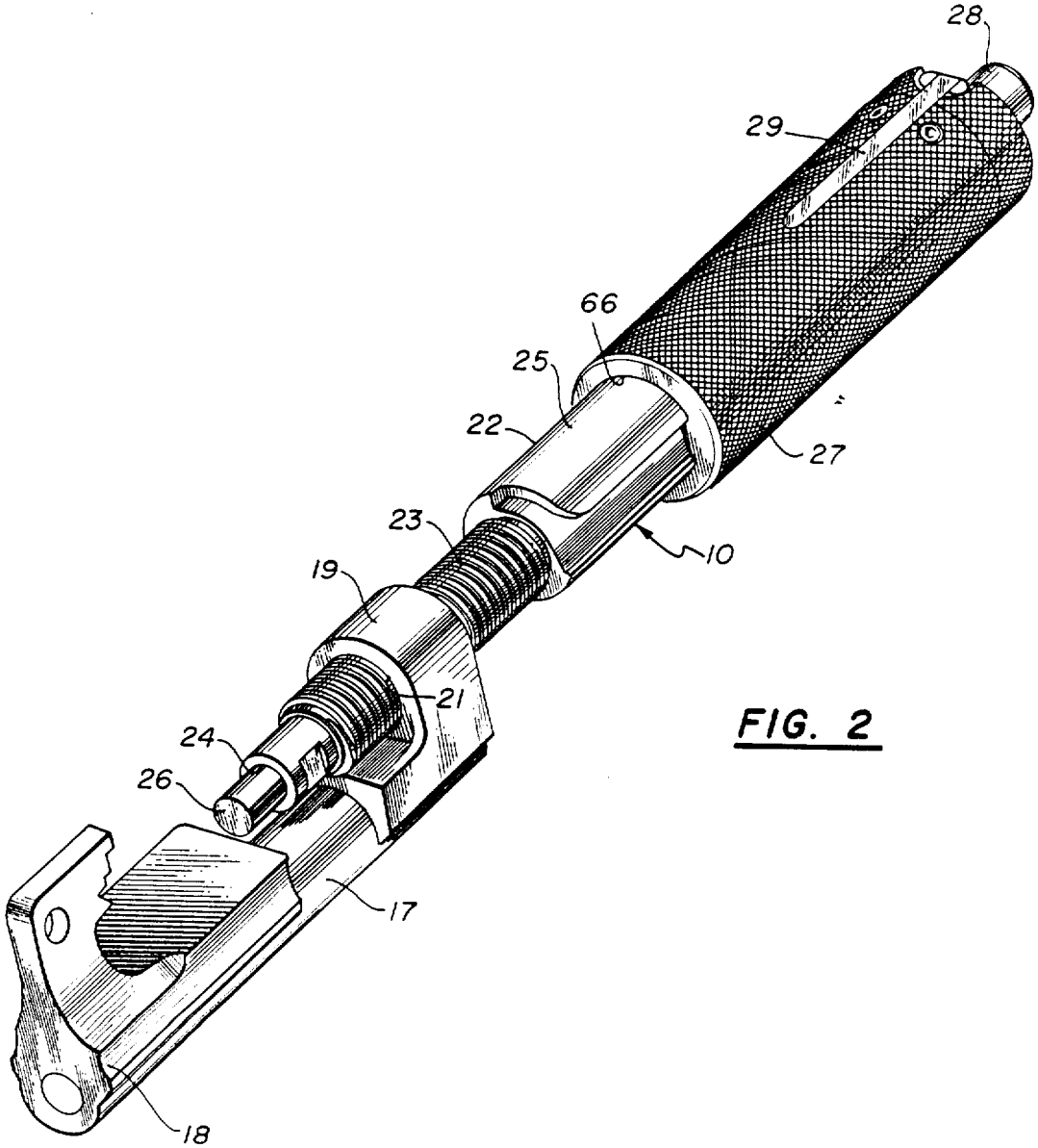

Referring next to FIG. 2, it can be seen that the tool 10, which is used in assembling the electrical connector 11, is provided with a base 17 having an anvil 18 at one end to engage the clamp or sleeve 15 of the connector and an abutment 19 at the other end provided with a threaded bore 21, which threaded bore is aligned with the anvil 18.

Carried in the abutment 19 is an adjusting member 22 having a threaded portion 23 which is carried in the threaded bore 21. The adjusting member has a primary bore 24 which is coaxial of the threaded bore 21. The adjusting member 22 is also provided with a cylindrical head 25 that is non-coextensive with the threaded portion 23.

A driving rod 26 is slidably carried in the primary bore 24 and a tubular housing 27 is slidably and rotatably carried on the cylindrical head 25 of the adjusting member 22. A hammer or striker 28 is carried by the housing 27 in alignment with the driving rod 26. A detent 29 is mounted on the housing 27 and is engagable with a recess 31 (See FIG. 10) formed on the said cylindrical head 25 to lock the housing 27 in a selected firing position on the head.

Figure 3:
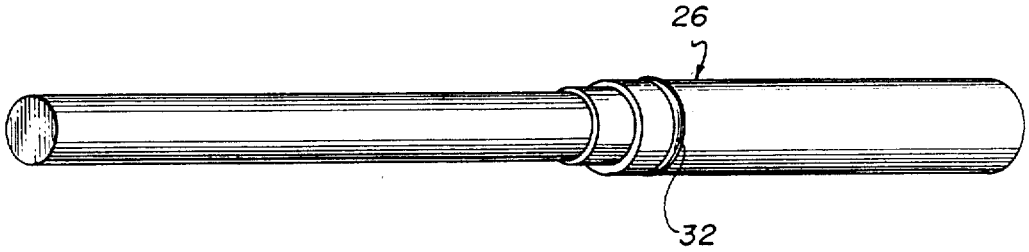

FIG. 3 shows the details of the drive rod 26, including a spring ring 32 which acts as a gas seal.

Figure 4:
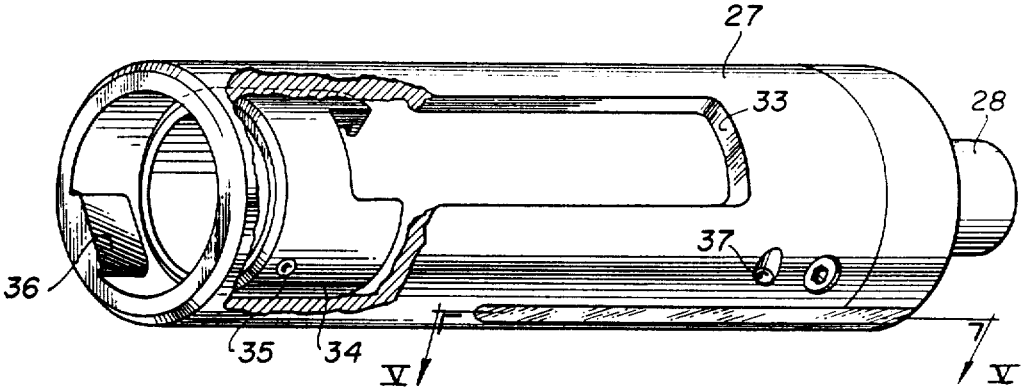

In FIG. 4 it can be seen that the housing 27 has a generally tubular configuration and is provided with a window 33. This is view of the drawings also shows an extractor 34 which is slidably mounted on the head 25 of the adjusting member and has its axial motion limited by a set screw 35. A lug 36 extends inwardly of the housing 27 for a purpose to be described hereinafter. The detent 29 is shown as pivotally supported on a transverse hinge pin 37. In its outer end, adjacent the detent, the striker 28 is provided with a hammer block 38.

Figure 5:
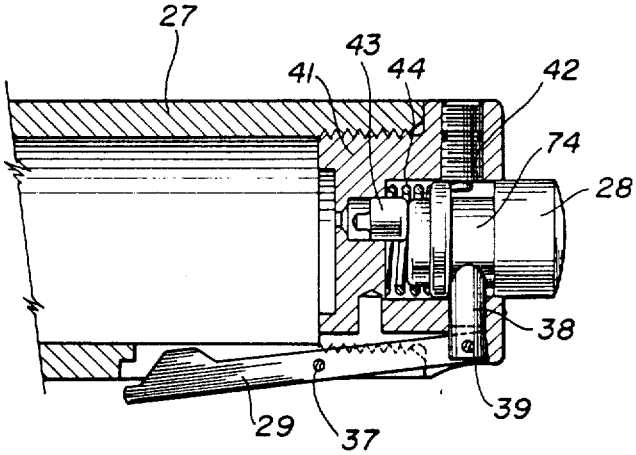

Referring next to FIG. 5, the sectional view of the outer end of the housing 27 show the inter-relationship of the detent 29 to the striker 28. The end of the detent 29 adjacent the striker 28 is provided (as has been described) with the hammer block 38 to which it is hingedly attached by means of a pivot pin 39. A bushing 41 is mounted in the end of the housing 27 and is provided with a coaxial bore in which is slidable mounted the striker 28. A set screw 41 operating in a groove in the striker serves to limit its axial motion. Also mounting in the bushing 41 is a firing pin of 43. The coil spring 44 serves to bias the striker 28 to its outermost position.

Figure 6:
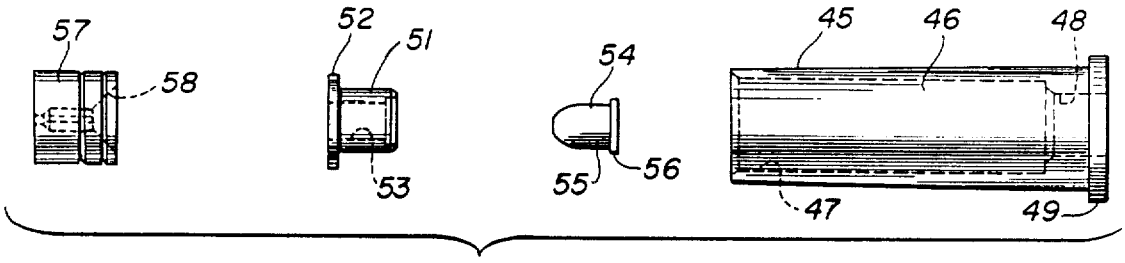
Figure 7:
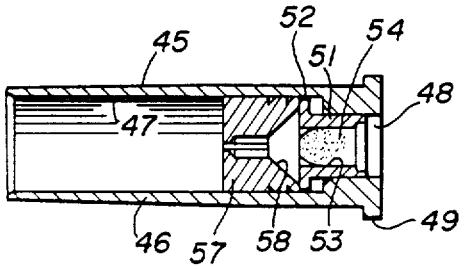
Figure 8:
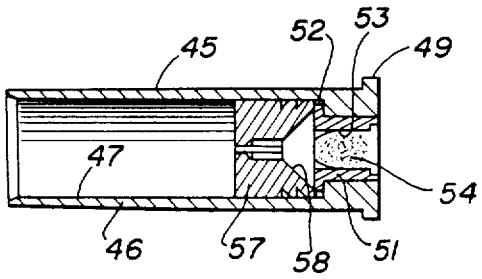

FIGS. 6, 7, and 8 show the details of an explosive cartridge 45 which is provided with an elongated shell case 46. The shell case has a longitudinal main bore 47 that opens at one end and has a communicating smaller bore 48 opening on the other end. The said other end is provided with a radial flange 49. The cartridge is provided with a bushing 51 which is slidably in the smaller bore 48 and has a flange 52 that is slidable in the longitudinal main bore 47, the bushing having a coaxial bore 53 extending through it. A power cell 54, having a cylindrical main body 55 which fits snugly in the coaxial bore 53 of the bushing 51. The cell is also provided with a radial flange 56 at one end to engage the other end of the bushing 51. The power cell 54 has an integral explosive material in the interior and a primer which is actuated at the said one end of the cell having the flange 56. Finally, a piston 57 is slidably carried in the main bore and is provided with a recess 58 that faces the bushing 51 and the power cell 54.

Figure 9:
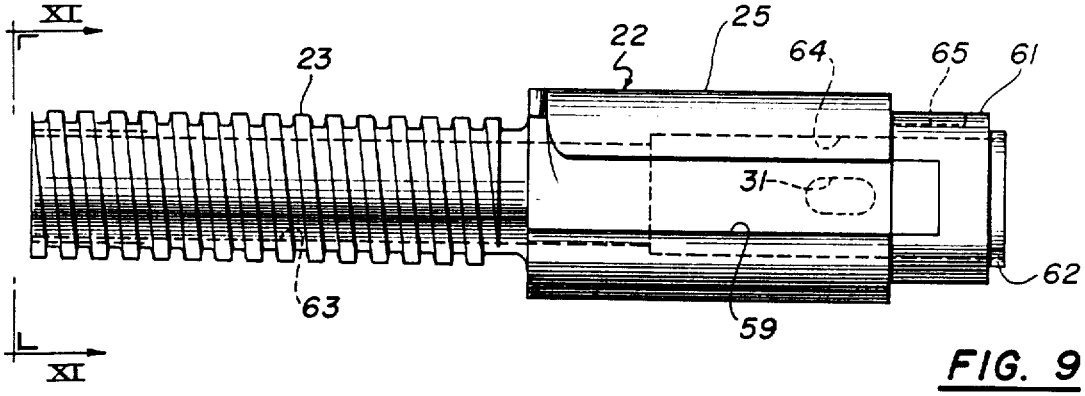
Figure 10:
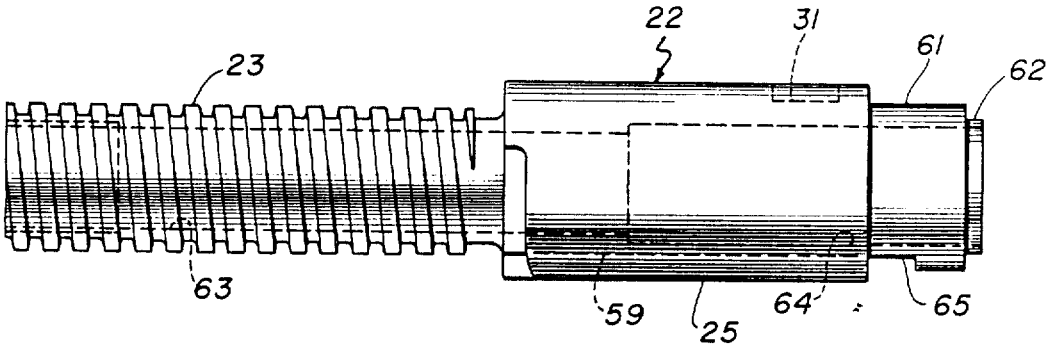
Figure 11:
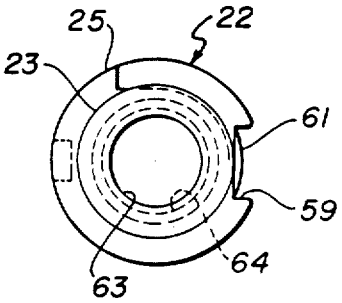

FIGS. 9, 10, and 11 show the detail of the main adjusting member 22, including the threaded portion 23. The end 25 is provided with a longitudinal groove 59 which engages the lug 36 on the housing 27 (See FIG. 4). Extending from the end of the end 25 (opposite the end from which the threaded portion 23 extends) is a cylindrical extension 61 on which slides the extractor 34, as will be described fully hereinafter. Extending beyond the extension 61 is a tubular extension 62 having a smaller exterior diameter than the extension 61. Extending axially into the adjusting member 22 at the end having the threaded portion 23 is a bore 63 which has a diameter adequate to slidably engage the larger end of the drive rod 26 and the spring ring 32. Entering the other end of the head 25 is a chamber or bore 64 which is of a size to receive the cartridge 45. A circumferential groove 65 partially surrounds the extension 61; it is in this groove that the set screw 35 resides to limit the motion of the extractor 34.

Figure 12:
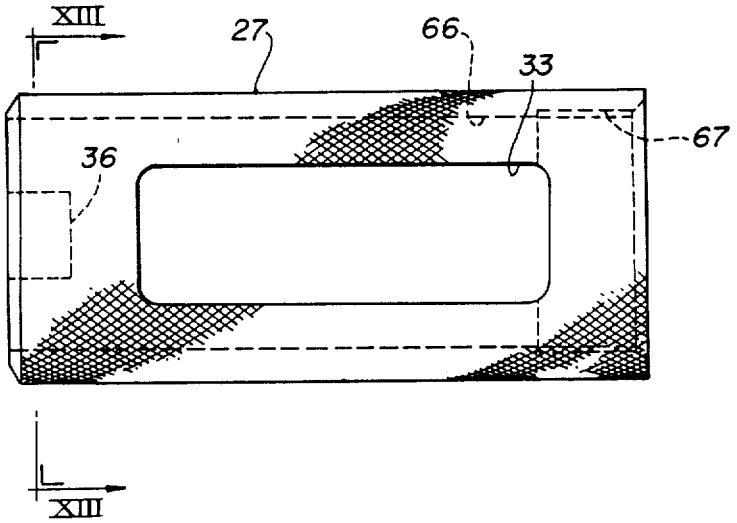
Figure 13:
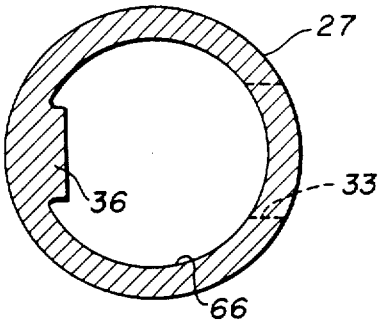

FIGS. 12 and 13 shows the details of the breech or housing 27. The housing is generally tubular and has an interior bore 66 (See also FIG. 2) in which is slidable the head 25 of the adjusting member. The outer diameter of the head 25 and the bore 66 are approximately the same. These views show the lug 36 (which normally resides in the groove 59) formed in the side of the head 25 of the adjusting member. The outer end of the bore 66 has threaded portion 67, that receives the bushing 41.

The bushing 41 has a threaded portion 68 which matches the threaded portion 67 in the housing 27. It is provided with an axial bore 69 in which is slidably received the striker 28. A circular coaxial recess or counterbore 71 enters the bushing 41 at the end opposite the bore 69. This recess is intended receive the head or flange 49 of the cartridge 45. Joining the end of the bore 69 and the recess 71 is a bore complex 72 intended to receive the firing pin 76.

Figure 15:
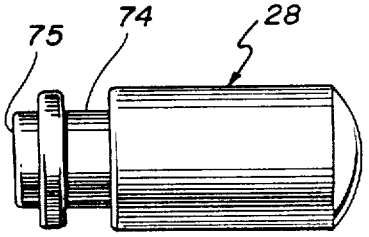

FIG. 15 shows the details of construction of the hammer or striker 28 including a groove 74 into which extends the radial set screw 42 that is mounted in a threaded bore 73 of the bushing 41 to limit movement of the striker. Otherwise, the striker is slidable axially in the bore 69 formed in the bushing 41 and is provided with a cylindrical extension 75 adapted to strike the firing pin 43.

Figure 16:
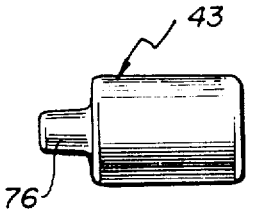

FIG. 16 shows the detail of the firing pin 43, including a smaller extension 76 intended to engage the cartridge 45 to cause the explosion of the power cell 54 by striking its primer. The firing pin is generally cylindrical in sized to fit in the bore complex 72 of the bushing 41.

Figure 17:
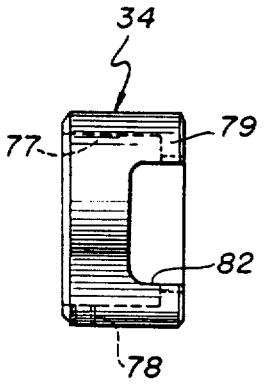
Figure 18:
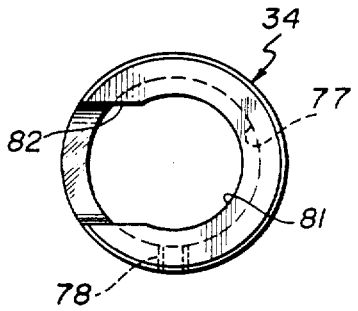

FIGS. 17 and 18 show the details of construction of the extractor 34. The extractor is provided with a main bore 77 which fits snugly and slidably on the cylindrical extension 61 of the head 25 of the adjustable member 22. Furthermore, a threaded bore 78 extends transversly into the bore 77 to receive a set screw which engages the groove 65 on the extension 61 to limit the axial motion of the extractor. The extractor is provided with an inwardly-directed flange 79 terminating in a bore or circular surface 81 to which extends a transverse slot 82. This slot not only extends into the flange 79 but also into the bore 77 as is evident in the drawing. The width of the groove 82 is the same as the diameter of the shell case 46 of the cartridge 45, while the diameter of the flange 49 of the cartridge is slightly larger than the diameter of the flange 81 of on the extractor. Axial movement of the extractor sliding along the extension 61 serves to engage the flange 49 and to withdraw the cartridge from the chamber or bore 64 in the head of the adjustable member.

Figure 19:
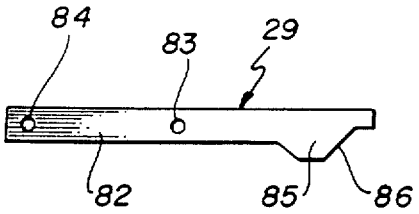

FIG. 19 shows the detail of the latch or detent 29. It consists of an elongated, generally rectangular body 82 having a transverse central bore 83 that is adapted to receive the hinge pin 37. One end is provided with another transverse bore 84 that receives a pivot pin 39 joining it to the hammer block 38. Extending inwardly at the other end of the main body 82 is an abutment 85 having an inclined cam surface 82.

Figure 20:
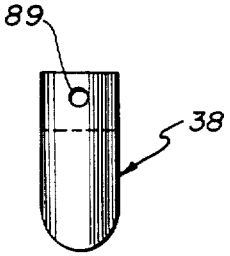
Figure 21:
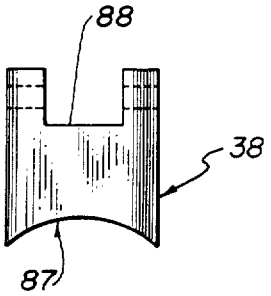
Figure 22:
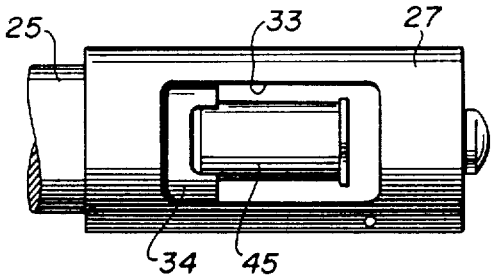
Figure 23:
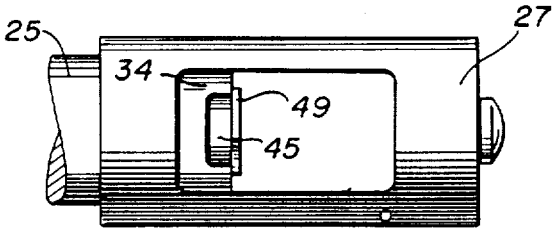

FIGS. 20 and 21 show the details of the hammer block 38, including a curved concave surface 87 demenisoned to fit into a radial groove 74 formed on the striker 28. The upper end has a notch 88 to receive the safety latch 29 as well as a bore 89 to receive the hinge pin 39.

The operation and the advantages of the present invention will be readily understood in view of the above description. Referring to FIG. 1, it can be seen that, in order to drive the wedge 16 into the sleeve 15 of the connector 11, the anvil 18 is placed at one side of the sleeve 15 while the adjusting member 22 is rotated to advance the piston rod 26 to snug contact with the wedge 16. In this condition, the tool has already been loaded with the cartridge 45 and is in condition to be actuated. The installer then strikes the striker 28 with hammer 14, thus causing the cartridge to explode and drive the piston rod 26 forcefully toward the anvil 18 to draw the wedge 16 and the sleeve 15 together in a locking electrical engagement.

The above description of operation is the usual one for tools of this type and assumes that the tool has already been loaded with the cartridge. In order to reach this condition, the present tool must be loaded first; this may be done at a location away from the cables 12 and 13 and from the connector 11. The description of the loading operation refers to FIGS. 22–27. In order to load the housing 27, it is drawn to the extreme right of the head 25 of the adjusting member, thus allowing the cartridge 45 to be placed within the housing through the window 33. In this position the extractor 34 is in the extreme right-hand position on the extension 61 of the head 22 of the adjusting member. The main body 46 of the cartridge has a diameter exactly equal to the width of the slot 82 on the extractor and therefore, can be moved radially inwardly until it is coaxial with the bore 64 in the head 25 and can be moved axially into it.

Now, when the cartridge 45 is thus inserted into the chamber, it is in the condition shown in FIG. 7; that is to say the piston, the bushing 51, and the power cell 54 are all in a left-hand position, so that the flange 56 on the power cell is set well inside the small bore 48. This means that is safely located away from the firing pin 43 in the housing.

In FIG. 3 the housing 27 is moved to the left (along the head 25) and the cartridge 45 is located as far into the chamber as possible, with its flange 49 resting against the exterior radial surface of the extractor 34.

Figure 24:
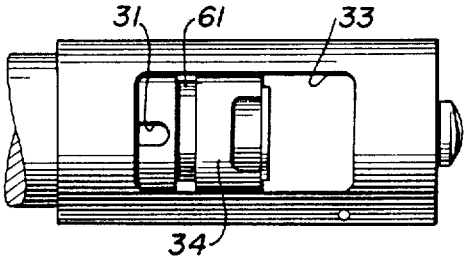

In FIG. 24 it can be seen that the housing 27 is moved even further along the head 25 until the recess 31 on the head 25 is exposed within the window 33. At that time, the extractor 34 is seen as substantially spaced from the main body of the head 25. Of course, it is limited to the amount it can slide axially, because of the engagement of the set screw in the bore 18 reaching the limit in the groove 65.

Figure 25:
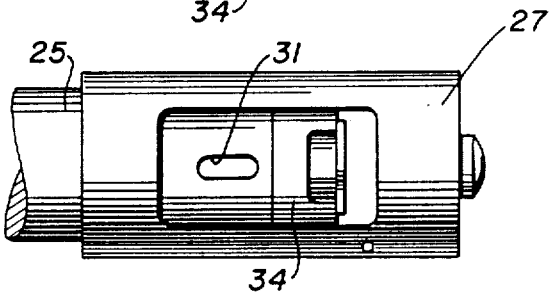

As shown in FIG. 25, the housing 27 is moved further to the right on the head 25; thus entirely exposing the recess 31 and sliding the extractor 34 back against the main body of the head. The reason this last motion takes place is that the extractor strikes the abutment 85 on the detent 29 and is, therefore, pushed backward along the abutment 61 of the head.

Figure 14:
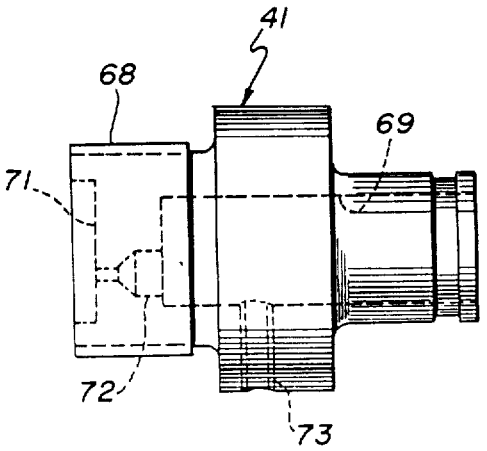
Figure 26:
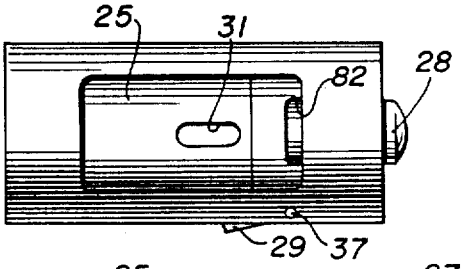
Figure 27:
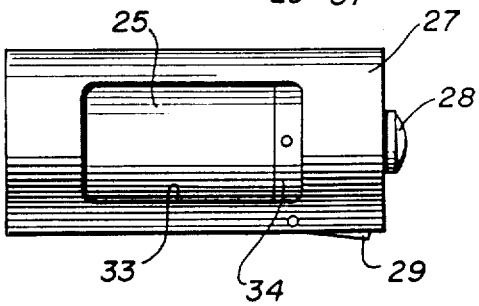

Further motion takes place (as shown in FIG. 26) moving the housing 27 to the left on the head 25 and resulting in the extractor and the flange 49 of the cartridge 45 coming in contact with the end of the bushing 41. The flange 49 of the cartridge 45 lies in the recess 71 (See FIG. 14) of the bushing. At that time the abutment 85 of the detent 29 has engaged the surface of head 25 and is pivoted about its pivot pin 37. This pushes the other end radially inwardly and causes the hammer block 38 to reside in the groove 74 in the hammer 28 which serves to prevent the hammer from advancing axially to bring the firing pin 43 into contact with the cartridge. The feeding of the housing 27 to the left has caused the cartridge to be pressed to its left in the chamber and bring the piston 57 into contact with the end of the drive rod 26, the drive rod residing in the bore 47 in the cartridge. This causes the cartridge elements to move to the right within the main housing or casing of the cartridge so that the cartridge is in the condition shown in FIG. 8 and is ready to fire. This is the condition shown in FIG. 26; the abutment 85 of the detent 29 rests on the surface of the head 25. The housing is then rotated, so that the lever 29 eventually reaches a point where its abutment 85 falls into the recess 31 of the housing and locks the housing in that position. At that time the slot 82 in the extractor 34 has been rotated so that it is no longer coextensive with the window 33. When the condition shown in FIG. 27 is reached, there is no path between end of the cartridge and the window 33 to allow escape of gases. In other words, the mechanisms has been obturated so that the resulting explosion and the gases expanding serves only to push the drive rod 26 toward the wedge. This effect is accomplished by hitting the striker 28 with a hammer; thus bringing the firing pin 43 and its extension 76 into contact with the primer of the power cell 54. The explosion takes place, gas expands in the recess 58 of the piston 57, driving the piston to the left (in FIG. 8). This, in turn, presses the piston against the drive rod 26 and causes it to move to the left, thus forcing the wedge 16 into the sleeve 15 to complete the electrical connection.

After the tool has been fired, the operator rotates the housing 27 in the opposite direction. This brings the slot 82 and the extractor 34 within the projection of the window 33. Gas which lies between the piston 57 and the other elements is then released through the slot 82 in the extractor. Dispite the extreme gas pressure, it is a simple matter to rotate the housing 27; there is no need for complicated apparatus to perform this function (as has been true in the prior art where a large number of threaded elements needed to be rotated in order to release the gas). Once the housing 27 is rotated to produce the appearance of apparatus shown in FIG. 26 (which rotation has been possible only by depressing the detent 29), it is possible to slide the housing 27 to the right, arriving at a condition similar to FIG. 25. Further movement to the right causes the abutment 85 on the detent 29 to engage the edge of the extractor 34, so that the extractor moves to the right on the abutment 61 of the head 25 of the adjustable element 22. The forcing of the extractor to the right pulls the cartridge 45 to the right also and, eventually, the apparatus reaches the condition shown in FIG. 22 in which the cartridge is free of its chamber and can be removed through the window 33. The tool is then in condition for reloading and reuse in another situation.

It can be seen, then, that the release of the gas after firing is a relatively simple matter, involving only the easy unlocking of the latch 29 and the rotation of the housing 27. This can take place at a very rapid rate, if so desired.

Secondly, a safety feature is inherent in the fact that the cartridge 45 remains in the condition shown in FIG. (out of reach of the firing pin) until the closed or obturated condition shown in FIG. 27 has been reached. At that time, it is in the condition shown in FIG. 8, i.e., ready to fire. Actually, two conditions have to exist in order to place the cartridge in the condition shown in FIG. 8. First of all, the head and the extractor 34 has to be moved to the right in the housing 27 and in to contact of the bushing 41. At the same time, the drive rod 26 has to lie entirely within the cartridge 45 and the bore 47 and pressing against the piston 57. In locking up the equipment prior to firing, the fact that the latch 29 rotates and its abutment 85 falls in the recess 31 makes a substantial noise or audible click that indicates to the operator that the apparatus is in condition for firing and that obturation has taken place completely. Also, until the detent occupys its position lying in the recess 31 it is impossible to operate the hammer or striker 28, because of the presence of the hammer block 38 lying in the groove 74 on the striker 28. It can be seen, then, that two safety factors are involved: (1) the cartridges are not rendered firable and (2) the striker 28 is not rendered movable until complete obturation has taken place, so that there is no danger of premature firing or escape of gases from the firing chamber.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patents is:

1. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, (c) a driving rod slidably carried in the primary bore, (d) a tubular housing slidably and rotatably carried on the cylindrical head, (e) a striker carried by the housing an alignment with the driving rod, and (f) a detent mounted on the housing and engageable with a recess formed on the said cylindrical head to lock the housing in a selected firing position on the head.

2. Tool as recited in claim 1, wherein the head is mounted on the adjusting member and has a chamber bore adapted to receive a tubular cartridge containing a piston and having an explosive power cell, wherein the striker has a firing pin aligned with said power cell, the piston being movable within the cartridge by contact with the rod from a first position spaced from the firing pin to a second piston adjacent the firing pin.

3. Tool as recited in claim 1, wherein the said cylindrical head has a chamber bore adapted to receive a cartridge, and wherein an elongated shell case having a longitudinal main bore opening on one end and a communicating smaller bore opening on the other end, a bushing having a cylindrical portion slidable in the small bore and a flange at one end slidable in the longitudinal main bore, the bushing having a coaxial bore extending through it, a power cell having a cylindrical main body fitting snugly in the coaxial bore of the bushing and a radial flange at one end to engage the other end of the bushing, the power cell having internal explosive material and primer that is actuated at the said one end of the cell having the flange, and a piston slidably carried in the main bore and having a recess facing the bushing and the power cell.

4. Tool as recited in claim 3, wherein the cartridge has a passage leading from the power cell to the exterior of the cartridge, wherein the housing has a window for the introduction of the cartridge into the head, wherein the detent prevents the operation of the striker except when the housing is in the said firing position, the gas pressure resulting from the actuation of the power cell being relieved after firing by flow through the small-bore in the cartridge shell case into the housing and through the window to the exterior of the housing.

5. Tool as recited in claim 4, wherein the striker is mounted in alignment with the cartridge and with the driving rod; and wherein the striker has a firing pin aligned with the said power cell, the bushing and power cell being movable within the cartridge by contact with the rod from a first position spaced from the firing pin to a second position adjacent the firing pin.

6. Tool as recited in claim 5, wherein the striker is cylindrical, and wherein the detent is engageable with a groove formed on the striker to lock the striker in a non-firing position in the housing until obturation has been completed.

7. Explosive cartridge, comprising:

(a) an elongated shell case having a longitudinal main bore opening on one end and a communicating smaller bore opening on the other end, (b) a bushing having a cylindrical portion slidable in the smaller bore and a flange at one slidable in the longitudinal main bore, the bushing having a coaxial bore extending through it, (c) a power cell having a cylindrical main body fitting snugly in the coaxial bore of the bushing and a radial flange at one end to engage the other end of the bushing, the power cell having internal explosive material and primer that is actuated at the said one end of the cell having the flange, and (d) a piston slidably carried in the main bore and having a recess facing the bushing and the power cell.

8. Tool using an explosive power cell, comprising:

(a) a cylindrical head having a chamber receiving a cartridge containing a power cell, the cartridge having a passage leading from the power cell to the exterior of the cartridge, (b) a tubular housing slidably and rotatably mounted on the head, the housing having a window for the introduction of the cartridge into the head, (c) striker with a firing pin mounted on the housing in alignment with the chamber, and (d) a detent mounted on the housing for locking the housing on the head in a firing position, the detent preventing operation of the striker except when the housing is in the said firing position, the gas pressure resulting from the actuation of the power cell being relieved after firing by flow through the passage in the cartridge into the housing and through the window to the exterior of the housing.

9. Tool as recited in claim 8, wherein the cartridge has an elongated shell case having a longitudinal main bore opening on one end and a communicating smaller bore opening on the other end, and the bushing has a cylindrical portion slidable in the smaller bore and a flange at one end slidable in the longitudinal main bore, the bushing having a coaxial bore extending through it, wherein the power cell has a cylindrical main body fitting snugly in the coaxial bore of the bushing and a radial flange at one end to engage the other end of the bushing, the power cell having internal explosive material and a primer that is actuated at the said one end of the cell having the flange, and wherein a piston is slidably carried in the main bore and has a recess facing the bushing and the power cell.

10. Tool for use in assembling an electrical connector, which connector includes a clamp and a wedge, comprising:

(a) a base having an anvil at one end to engage the clamp and on abutment at the other end having a threaded bore aligned with the anvil, (b) a threaded adjusting member carried in the threaded bore, the member having a primary bore coaxial of the threaded bore, (c) a driving rod slidably carried in the primary bore, (d) a chamber head mounted on the adjusting member and having a chamber bore adapted to receive a tubular cartridge containing a piston and having an explosive power cell, (e) a striker mounted in alignment with the cartridge and the driving rod and having a firing pin aligned with the said power cell, the piston being movable within the cartridge by contact with the rod to move the power cell from a first position spaced from the firing pin to a second position adjacent the firing pin.

11. Tool as recited in claim 10, wherein the cartridge has an elongated shell case having a longitudinal main bore opening on one end and a communicating smaller bore opening on the other end, a bushing having a cylindrical portion slidable in the smaller bore and a flange at one end slidable in the longitudinal main bore, the bushing having a coaxial bore extending through it, wherein the power cell has a cylindrical main body fitting snugly in the coaxial bore of the bushing and a radial flange at one end to engage the other end of the bushing, the power cell having internal explosive material and primer that is actuated at the said one end of the cell having the flange, and wherein a piston is slidably carried in the main bore and has a recess facing the bushing and the power cell.

12. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, (c) a driving rod slidably carried in the primary bore, (d) a tubular housing slidably and rotatably carried on the cylindrical head, (e) a cylindrical striker carried by the housing and aligned with the driving road, and (f) a detent mounted on the housing and engageable with a groove formed on the said striker to lock the striker in a non-firing position in the housing until obturation has been completed.

13. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, the head having a bore that is adapted to receive a cylindrical cartridge containing an explosive power cell, (c) a driving rod slidably carried in the primary bore, (d) a tubular housing slidably and rotatably carried on the cylindrical head, (e) a striker carried by the housing in alignment with the driving rod, and (f) means locking the housing in a selected firing position on the head, preventing the operation of the striker except when the housing is in the said firing position, and (g) means rendering the cartridge inoperative except when the housing is in the said firing position.

14. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, (c) a driving rod slidably carried in the primary bore, (d) a tubular housing slidably and rotatably carried on the cylindrical head, (e) a striker carried by the housing in alignment with the driving rod, and (f) a detent mounted on the housing and engageable with a recess formed on the said cylindrical head to lock the housing in a selected firing position on the head, and (g) a cartridge carried in the cylindrical head and housing, a passage leading from a power cell to the exterior of the cartridge, wherein the tubular housing has a window for the introduction of the cartridge into the head, wherein the said detent prevents the operation of the striker except when the housing is in the said firing position, the gas pressure resulting from an actuation of the power cell being relieved after firing by flow through a small bore in the cartridge into the housing and through the window to the exterior of the housing.

15. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion and which carries a cartridge, (c) a driving rod slidably carried in the primary bore, (d) a tubular housing slidably and rotatably carried on the cylindrical head, (e) a striker carried by the housing in alignment with the driving rod, and (f) a detent mounted on the housing and engageable with a recess formed on the said cylindrical head to lock the housing in a selected firing position on the head, wherein the striker is mounted in alignment with the said cartridge and with the said driving rod; and wherein the striker has a firing pin aligned with a power cell in the cartridge, the power cell being movable within the cartridge by contact with the rod from a first position spaced from the firing pin to a second position adjacent the firing pin.

16. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, (c) a driving rod slidably carried in the primary bore, (d) a tubular housing slidably and rotatably carried on the cylindrical head, (e) a striker carried by the housing in alignment with the driving rod, and (f) a detent mounted on the housing and engageable with a recess formed on the said cylindrical head to lock the housing in a selected firing position on the head, wherein the striker is cylindrical, and wherein the detent is engageable with a groove formed on the striker to lock the striker in a non-firing position in the housing until obturation has been completed.

17. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, the head having a chamber bore that is adapted to receive a tubular cylindrical cartridge containing a piston and an explosive power cell, (c) a driving rod slidably carried in the primary bore, (d) a tubular housing slidably and rotatably carried on the cylindrical head, (e) a striker carried by the housing in alignment with the driving rod, (f) means locking the housing in a selected firing position on the head, preventing the operation of the striker except when the housing is in the said firing position, and (g) means rendering the cartridge inoperative except when the housing is in the said firing position, wherein the head is mounted on the adjusting member and wherein the striker has a firing pin aligned with the said power cell, the piston being movable within the cartridge by contact with the rod from a first position spaced from the firing pin to a second piston adjacent the firing pin.

18. Tool for use in assembling an electrical connector, which connector consists of a clamp and a wedge, comprising:

(a) a base having an anvil at one end to engage the clamp and an abutment at the other end having a threaded bore aligned with the anvil, (b) an adjusting member having a threaded portion carried in the threaded bore, the member having a primary bore which is coaxial of the threaded bore, the adjusting member having a cylindrical head that is non-coextensive with the threaded portion, the head having a chamber bore that is adapted to receive a cylindrical cartridge containing an explosive power cell, (c) a driving rod slidably carried in the primary bore, (d) a tubular housing slidably and rotatably carried on the cylindrical head, (e) a striker carried by the housing in alignment with the driving rod, (f) means locking the housing in a selected firing position on the head, preventing the operation of the striker except when the housing is in the said firing position, and (g) means rendering the cartridge inoperative except when the housing is in the said firing position, wherein the said cartridge has an elongated shell case having a longitudinal main bore opening on one end and a communicating smaller bore opening on one end, a bushing having a cylindrical portion slidable in the small bore and a flange at one end slidable in the longitudinal main bore, the bushing having a coaxial bore extending through it, the power cell having a cylindrical main body fitting snugly in the coaxial bore of the bushing and a radial flange at one end to engage the other end of the bushing, the power cell having internal explosive material and primer that is actuated at the said one end of the cell having the flange, and a piston slidably carried in the longitudinal main bore of the shell case and having a recess facing the bushing and the power cell.

19. Tool as recited in claim 18, wherein the cartridge has a passage leading from the power cell to the exterior of the cartridge, wherein the housing has a window for the introduction of the cartridge into the head, wherein the detent prevents the operation of the striker except when the housing is in the said firing position, the gas pressure resulting from the actuation of the power cell being relieved after firing by flow through the small bore in the cartridge shell case into the housing and through the window to the exterior of the housing.

20. Tool as recited in claim 18, wherein the striker is mounted in alignment with the cartridge and with the driving rod; and wherein the striker has a firing pin aligned with the said power cell, the bushing and power cell being movable within the cartridges by contact with the rod from a first position spaced from the firing pin to a second position adjacent the firing pin.

21. Tool as recited in claim 18, wherein the striker is cylindrical, and wherein the detent is engageable with a groove formed on the striker to lock the striker in a non-firing position in the housing until obturation has been completed.

*22. Explosive cartridge, comprising:*

*(a) an elongated shell case having a longitudinal main bore opening on one end and a communicating smaller bore opening on the other end,*

*(b) a bushing having a cylindrical portion at one end slidable in the smaller bore and a second cylindrical portion at the other end slidable in the longitudinal main bore, the bushing having a coaxial bore extending through it,*

*(c) a power cell having a cylindrical main body fitting snugly in the coaxial bore of the bushing and a radial flange at one end to engage the other end of the bushing, the power cell having internal explosive material and primer that is actuated at the said one end of the cell having the flange, and*

*(d) a piston slidably carried in the main bore and having a recess facing the bushing and the power cell.*

*23. Explosive cartridge, comprising:*

*(a) an elongated shell case having a longitudinal main bore opening on one end and a communicating smaller bore opening on the other end,*

*(b) a bushing having a cylindrical portion slidable in the smaller bore and a flange at one end slidable in the longitudinal main bore, the bushing having a coaxial bore extending through it,*

*(c) a power cell having a cylindrical main body fitting snugly in the coaxial bore of the bushing and a radial flange at one end to engage the other end of the bushing, the power cell having internal explosive material and primer that is actuated at the said one end of the cell having the flange, and*

*(d) a piston slidably carried in the main bore and having one end facing the bushing and the power cell.*

* * * * *